Sept. 5, 1933.　　　H. MASBRUCH　　　1,925,928
ANIMAL BLINDER
Filed Jan. 2, 1932　　　2 Sheets-Sheet 1

Inventor
Henry Masbruch
By Clarence A. O'Brien
Attorney

Patented Sept. 5, 1933

1,925,928

UNITED STATES PATENT OFFICE 1,925,928

ANIMAL BLINDER

Henry Masbruch, Platteville, Wis.

Application January 2, 1932. Serial No. 584,534

1 Claim. (Cl. 119—104)

This invention appertains to new and useful improvements in novel means for controlling animals, particularly vicious animals, such as bulls.

The principal object of this invention is to provide a blinder particularly adapted to permit the animal to see when his head is upright, but when it is lowered, prevents him from seeing forwardly, to obviously confuse the animal in the event he attempts to charge persons or other animals.

Other important objects and advantages of the invention will become apparent to the reader of the following specification.

In the drawings:—

Figure 1:
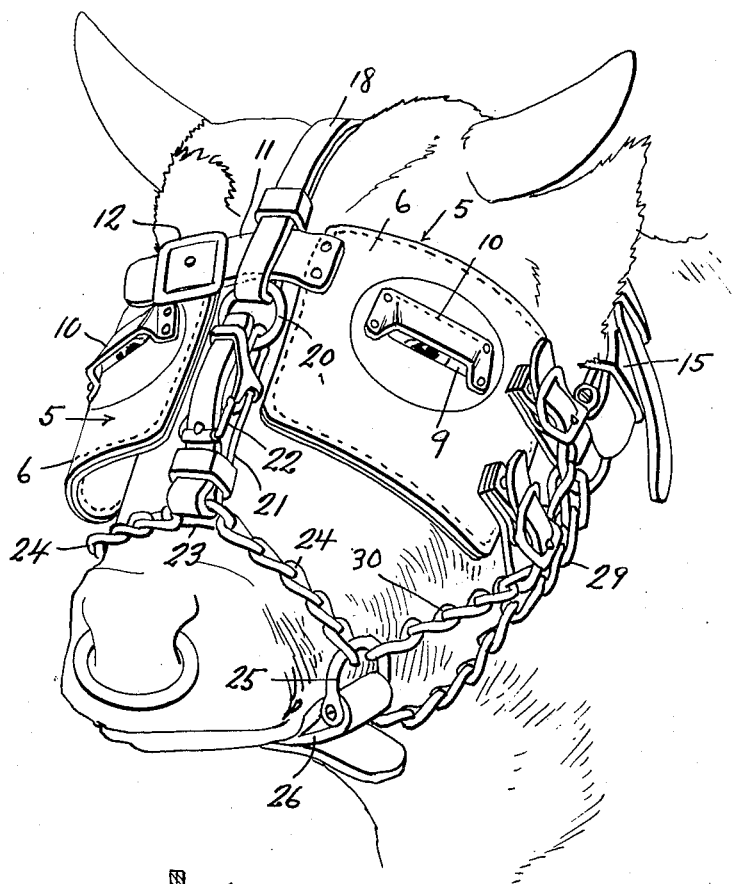
Figure 1 represents a view of the blinder attached to a bull's head.
Figure 3:
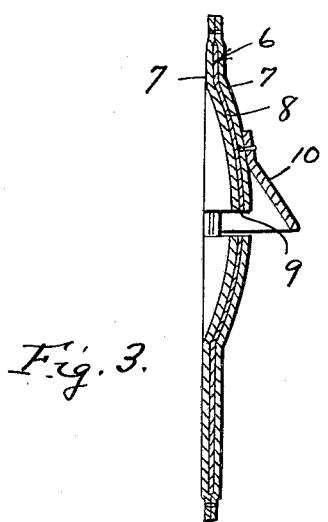
Fig. 3 represents a sectional view taken substantially on line 3—3 of Fig. 2.
Figure 2:
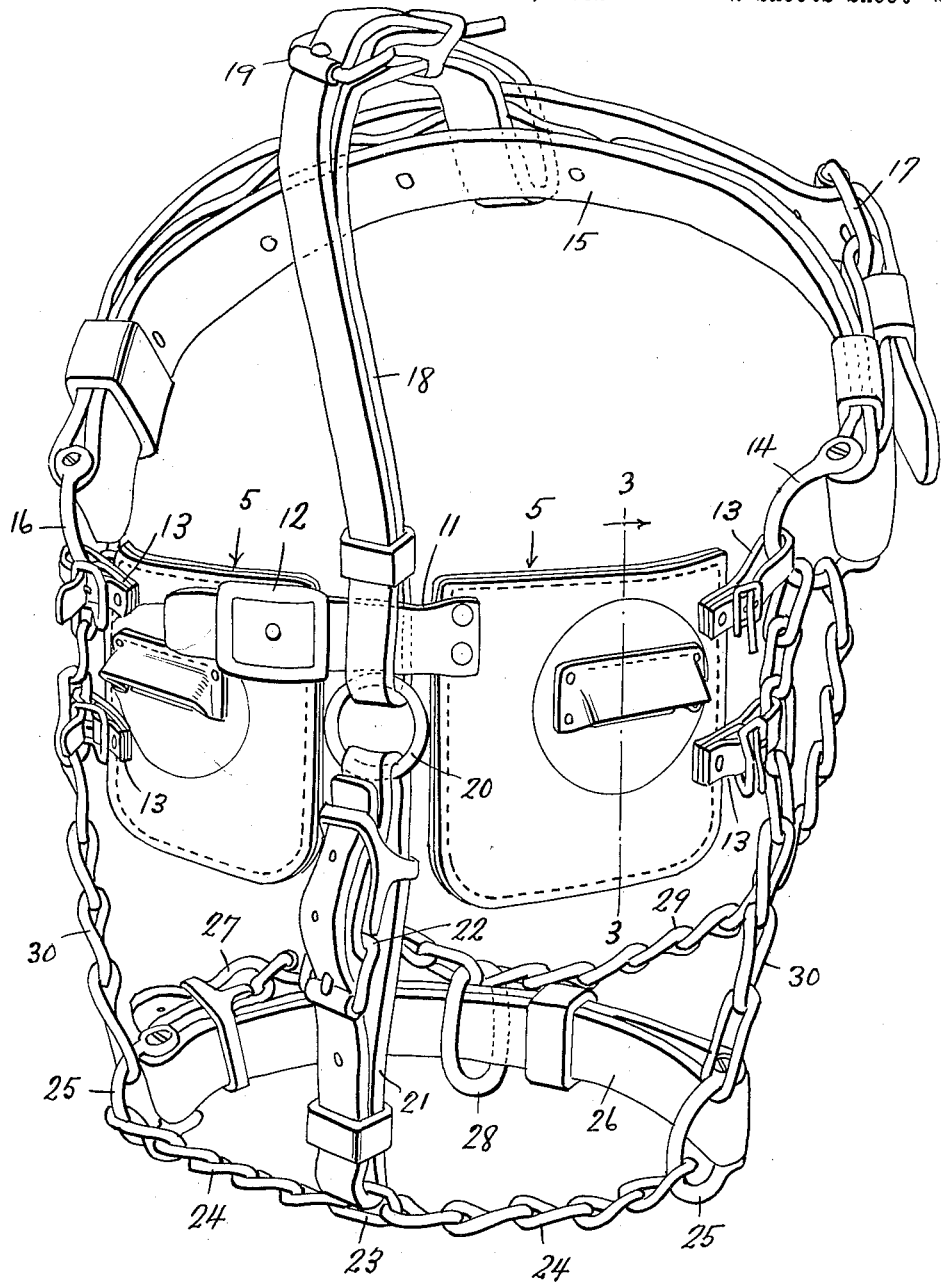
Fig. 2 represents a perspective view of the blinder complete.

Referring to the drawings wherein like numerals designate like parts, it can be seen that the blinder includes a pair of eye pieces, each generally referred to by numeral 5. Each of these eye pieces, as shown in Fig. 1, is constructed of a sheet of metal 6 covered on its opposite side with leather 7, the plate 6 being provided with a concavo-convex shaped portion 8 which has a slot 9 therein. This slot 9 extends through the plys of leather 7. An inclined beak type shade 10 is suitably secured to the outer ply 7 so as to afford a line of observation downwardly. Obviously, in order for the animals to obtain a horizontal view, it is necessary that he hold his head back somewhat in an unnatural position.

A strap 11 extends from one of the eye pieces 5 and is connected to the other eye piece 5 by the buckle 12. Other buckles and straps extend from the eye pieces 5 to form the adjustable loops 13, one of which is connected to the clevis 14 at one end of the neck band 15 while another loop 13 is connected to the clevis 16 at the opposite end of the neckband 15, the same being adjustable as at 17.

A strap 18 and buckle 19 are trained around the strap 11 and the intermediate portion of the neck band 15 for obviously passing over the forehead of the bull in the manner shown in Fig. 1. This strap 18 also engages through the ring 20 which has the strap 21 extending therethrough and this strap is disposed along the nose of the animal and is also adjusted by a buckle 22. The strap 21 passes through an elongated link 23 from which extend the chain sections 24—24 which at their outer ends are connected to the clevis members 25—25 on the ends of the throat band 26, the throat band being adjustable as at 27.

A tightening chain extends from the clevis 14 downwardly to be connected to the slip ring 28 and the buckle 27 and is denoted by numeral 29. Extending from the loops 13 are the chain sections 30—30 which extend downwardly to attach to the clevis members 25—25.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

A blinder for animals comprising a pair of eye pieces, means for securing said eye pieces to an animal head, said eye pieces being constructed of sheet metal and having a pliable covering thereon, each of said eye pieces having slits therein, and a beak-type of shade secured to the outer side of each of said eye pieces above said slits, said beak type of shades being of concavo-convex shape and surrounding the sides of said slits.

HENRY MASBRUCH.